US005536449A

United States Patent [19]

Feltz et al.

[11] Patent Number: 5,536,449

[45] Date of Patent: Jul. 16, 1996

[54] SINTERING CERAMIC FOR STABLE HIGH-TEMPERATURE THERMISTORS AND METHOD FOR PRODUCING THE SAME

[75] Inventors: Adalbert Feltz, Deutschlandsberg, Austria; Ralph Kriegel, Kahla, Germany; Franz Schrank, Graz, Austria

[73] Assignee: Siemens Aktiengesellschaft, Muenchen, Germany

[21] Appl. No.: 290,595

[22] Filed: Aug. 15, 1994

[30] Foreign Application Priority Data

Aug. 13, 1993 [DE] Germany .......................... 43 27 285.1

[51] Int. Cl.[6] .............................. H01C 7/06; H01C 7/02; C04B 35/01; C04B 41/85

[52] U.S. Cl. .......................... 252/521; 252/518; 501/123; 501/126; 501/152; 501/104; 338/22 R

[58] Field of Search .................................... 501/123, 126, 501/136, 94, 152, 104; 252/520, 521, 518; 338/22 R

[56] References Cited

U.S. PATENT DOCUMENTS

| | | | |
|---|---|---|---|
| 2,703,354 | 3/1955 | Wainer | 252/520 X |
| 4,110,260 | 8/1978 | Yamamoto et al. | 252/520 |
| 4,324,702 | 4/1982 | Matsuo et al. | 252/518 X |
| 4,729,852 | 5/1988 | Hata | 252/518 |
| 4,891,158 | 1/1990 | Hata | 252/518 |
| 5,432,024 | 7/1995 | Soma et al. | 501/123 X |

FOREIGN PATENT DOCUMENTS

| | | |
|---|---|---|
| 0149681 | 7/1985 | European Pat. Off. . |
| 63804 | 9/1968 | Germany . |
| 4213631 | 4/1992 | Germany . |

OTHER PUBLICATIONS

Zentschrift für anorganische und allgemeine Chemie, 617 (1992) pp. 99–104, (Kriegel et al.).

Holleman–Wiberg (1985) pp. 922–923, 1110–1117, "Lehrbuch der Anorganischen Chemie";.

National Technical Report, vol. 34, No. 4, Aug. 1988 pp. 379–388 (Ishikawa et al.) "Thermistor Sensor for Automotive Uses".

*Primary Examiner*—Douglas J. McGinty

*Attorney, Agent, or Firm*—Herbert L. Lerner; Laurence A. Greenberg

[57] ABSTRACT

A sintering ceramic for stable high-temperature thermistors includes a system of matter containing manganese (IV) and a content of a basic oxide. A method for producing a sintering ceramic for stable high-temperature thermistors includes calcining a mixture of $SrCO_3$ and $Mn_2O_3$ or $Mn_3O_4$; adding an oxide hydroxide of a dopant in a molar quantity x to an aqueous suspension of the calcined oxide mixture; and then carrying out a compacting densification of the system of matter.

6 Claims, 4 Drawing Sheets

SINTERING CERAMIC FOR STABLE HIGH-TEMPERATURE THERMISTORS AND METHOD FOR PRODUCING THE SAME

BACKGROUND OF THE INVENTION

Field of the Invention

The present invention relates to a sintering ceramic for stable high-temperature thermistors in the form of a system of matter containing manganese (IV), and to a method for producing such a sintering ceramic.

Semiconducting oxides of the transition elements and combinations thereof are known, for instance, from technical embodiments disclosed in an article in National Technical Report Vol. 34, No. 4, pages 24–34 (1988), entitled Thermistor Sensor for Automotive Uses, based on patent applications such as Published European Application No. 0 149 681 A1 and U.S. Pat. Nos. 4,729,852 and 4,891,158 in the case of the Mn—Ni—Cr—Zn—Zr—Si oxide system, and U.S. Pat. No. 4,324,702 in the case of the Mn—Ni—Cu—Fe—Dr oxide system. Multiphase systems are employed, but without seeking the advantage of forming a uniform phase. The rated resistance $R_{25}$ or $R_{10}O$ of a thermistor, or in other words the electrical resistance at the temperature T=25° C. and 100° C. and the material constant B of a thermistor that is definitive for the sensitivity of temperature measurement, is adjusted to variable values on the basis of such multiphase systems, in accordance with the following equation:

$$R(T)=R_0\exp(B/T)=R_{25/100}\exp\left(\frac{1}{T}-\frac{1}{298}\text{ or }\frac{1}{373}\right)$$

by carrying out the reaction accordingly in the sintering process, so that at a given offset, production of a certain assortment of thermistors is possible. That kind of procedure generally includes a considerable range of data deviation among the various examples, and especially from one batch to another, since the electrical parameters that characterize the thermistor assume different values depending on the sintered structure attained in the ceramic. In such systems that have been produced, the equilibrium composition of the phases is generally temperature-dependent, which has negative effects on the stability of the electrical parameters over time.

It has been demonstrated that the pure-phase spinel $_{MgNi}II_{Mn}IV_{O_4}$, because of an energetically stable association of the transition metal cations and the lattice places, is characterized by a relatively high B constant of approximately 4600K, and at the same time a rated resistance that is not overly low. The use of a ceramic based on that semiconducting compound as a high-temperature thermistor has been described in German Published, Non-Prosecuted Application DE 42 13 631 A. In that system, upon heating to approximately 700° C., the change in equilibrium composition of phases located next to one another does not occur, so that high stability over time and replicability of the electrical parameters are attained. Above 720°, because of the strong polarization of the oxide ions by the $Mn^{IV}$ cations, decomposition ensues with splitting off of oxygen, and therefore the temperature range within which the semiconducting ceramic based on $MgNiMnO_4$ can be used is limited.

SUMMARY OF THE INVENTION

It is accordingly an object of the invention to provide a sintering ceramic for stable high-temperature thermistors and a method for producing the same, which overcome the hereinafore-mentioned disadvantages of the heretofore-known devices and methods of this general type, in which the sintering ceramic has a high B constant and at the same time high uniformity and phase stability, and in which the method produces thermistors with high stability and sensitivity on such a basis for a temperature range up to 1200° C.

With the foregoing and other objects in view there is provided, in accordance with the invention, a sintering ceramic for stable high-temperature thermistors, comprising a system of matter containing manganese (IV) and a content of a basic oxide.

In accordance with another feature of the invention, the basic oxide is strontium oxide.

In accordance with a further feature of the invention, the system of matter is $Sr_{7-x}Mn_4O_{15}$, in which M is a dopant.

In accordance with an added feature of the invention, the dopant is selected from the group consisting of yttrium and lanthanum.

In accordance with an additional feature of the invention, the dopant is an element of the rare earths.

In accordance with yet another feature of the invention, the system of matter is $Sr_7M_xMn_{4-x}O_{15}$, in which M is a dopant.

In accordance with yet a further feature of the invention, the dopant is selected from the group consisting of scandium, titanium, zirconium, niobium and tantalum.

In accordance with yet an added feature of the invention, x>0 or x=0.

With the objects of the invention in view, there is also provided a method for producing a sintering ceramic for stable high-temperature thermistors, which comprises calcining a mixture of $SrCO_3$ and a substance selected from the group consisting of $Mn_2O_3$ and $Mn_3O_4$; adding an oxide hydroxide of a dopant in a molar quantity x to an aqueous suspension of the calcined oxide mixture to form a system of matter; and then carrying out a compacting densification of the system of matter.

In accordance with a concomitant mode of the invention, there is provided a method which comprises producing thermistor tablets from the system of matter by compacting shaping, and sintering the tablets at a temperature in the range of 1550° C.

Other features which are considered as characteristic for the invention are set forth in the appended claims.

Although the invention is illustrated and described herein as embodied in a sintering ceramic for stable high-temperature thermistors and a method for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
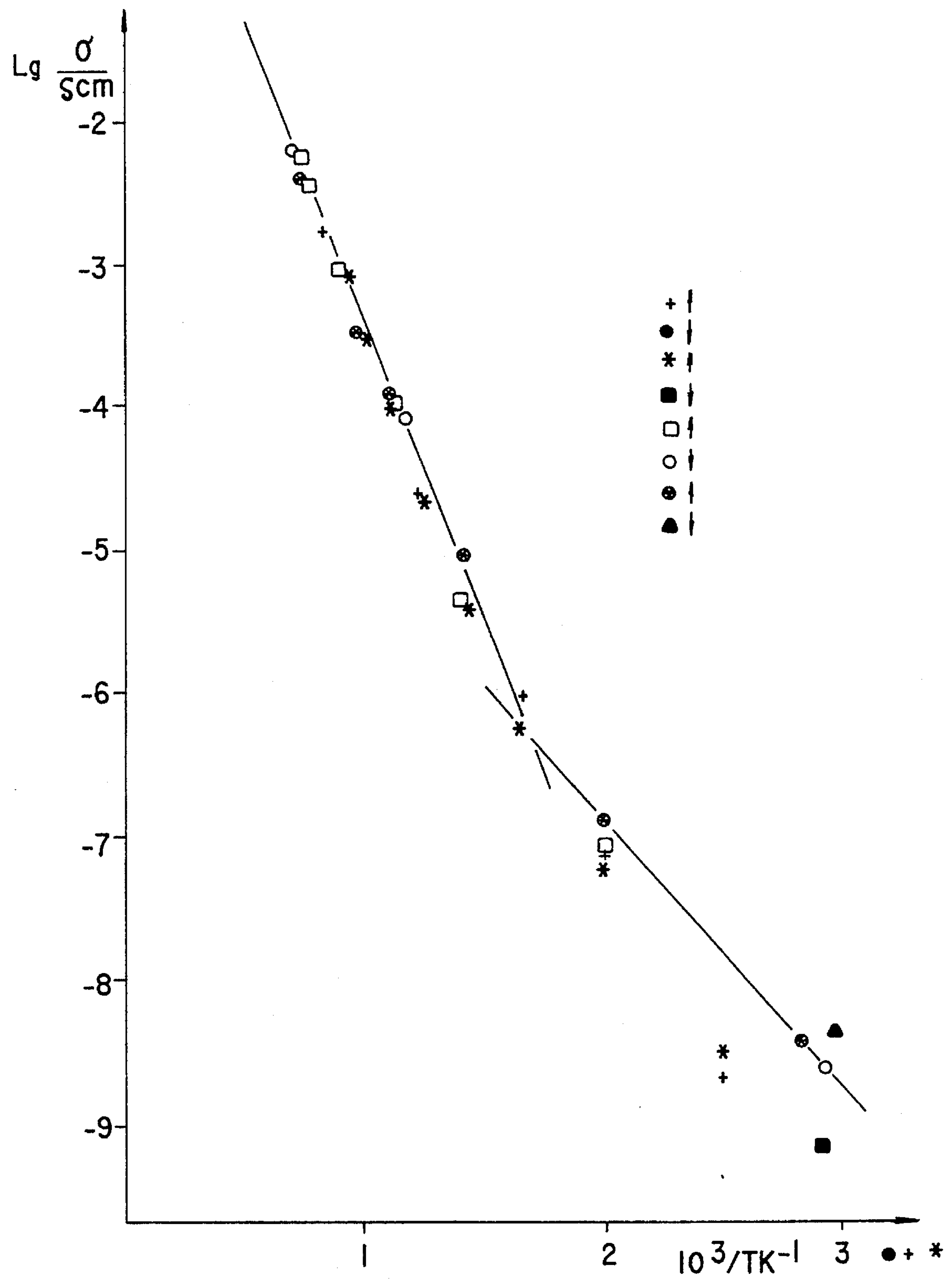
FIG. 1 is a diagram showing a specific conductivity as a function of a temperature of an $Sr_7Mn_4O_{15}$ ceramic.

Referring now to the embodiments of the invention in detail, it is noted that the heart of the invention is to stabilize the oxidation stage +4 of manganese in the compound $Sr_7Mn_4O_{15}$ by incorporating a basic oxide, particularly strontium oxide, into strontium manganate, because of the increased content of basic oxide, thereby raising the temperature of oxygen splitting to 1200° C., and at the same time making temperatures up to 1200° C. sensitively determinable by resistance measurements.

Special embodiments of the invention involve a sintering ceramic based on $Sr_{7-x}M_xMn_4O_{15}$ or $Sr_7M_xMn_{4-x}O_{15}$, in which M stands for a dopant that may be yttrium (Y), lanthanum (La) or an element of the rare earths in the first system mentioned, and may be scandium (Sc), titanium (Ti), zirconium (Zr), niobium (Nb) or tantalum (Ta) in the second system mentioned.

The parameter x is greater than zero in principle. Optionally, it may also be equal to zero, in which case the dopant is omitted.

In the method for producing a sintering ceramic according to the invention, it is provided that $SrCO_3$ and $Mn_2O_3$ or $Mn_3O_4$ are mixed in an aqueous slip in a molar ratio of the compound $Sr_7Mn_4O_{15}$ and converted, after filtration and drying by heating for 12 hours to 1000° C. After the ceramic powder mixture has been prepared into a pourable granulate by grinding with an 8% polyvinyl alcohol solution and compacting into tablets, electrical contacting is performed by painting on a platinum (Pt) conductive paste. The sintering densification is suitably carried out by heating to 1350° C., holding for several hours at 1550° C., and tempering at 1200° C., to form the ceramic according to the invention having a uniform structure which can be described by radiological structural analysis as a two-dimensional/infinite linkage of manganese (IV)-oxygen double octahedrons $[O_{1/2}O_2Mn^{IV}O_3Mn^{IV}OO_{2/2}]^7$. In this connection, reference should be made to an article in the publication Zeitschrift für anorganische und allgemeine Chemie [Journal of Inorganic and General Chemistry], Z. anorg. allg. Chem. 617 (1992), pages 99–104. In conclusion, the supply leads are fixed by bonding thin Pt wires to the electrodes. In another embodiment, the formation of the semiconducting ceramic can be carried out in the form of beads between thin platinum wires that are sintered into place.

In particular, it is provided in accordance with the invention that the electrical parameters of the $Sr_7Mn_4O_{15}$ ceramic be modified by purposeful doping in the following series:

$$Sr^{II}_{7-x}La^{III}_xMn^{IV}_{1-x}Mn^{III}_xO_{15} \qquad (0<x<0.1)$$

$$Sr^{II}_{7-x}Y^{III}_xMn^{IV}_{1-x}Mn^{III}_xO_{15} \qquad (0<x<0.1)$$

$$Sr^{II}_7Nb_x{}^VMn^{III}_xMn^{IV}_{4-2x}O_{15} \qquad (0<x<0.1)$$

$$Sr^{II}_7Mn^{IV}_{4-x}Sc^{III}_xO_{15-x/2} \qquad (0<x<0.1)$$

$$Sr^{II}_7Ti^{IV}_xMn^{IV}_{4-x}O_{15} \qquad (0<x<1)$$

so as to be able to adjust the electrical conductivity and the B constant to certain value ranges. To that end, the starting mixture, including $SrCO_3$ and $Mn_2O_3$ or $Mn_3O_4$, is first prepared, in accordance with the composition intended for a certain x value, without the addition of the dopant component by mixing in an aqueous slip, and is then calcined after filtering by heating to 1000° C. The product of conversion is suspended in water, and the composition is completed by adding the dopant component in the form of a suspension of freshly precipitated lanthanum oxide hydroxide, yttrium oxide hydroxide, scandium oxide hydroxide, niobium oxide hydroxide, or titanium oxide hydroxide. Further processing is carried out as described for the undoped $Sr_7Mn_4O_{15}$ ceramic.

The invention will be further described below in terms of the following exemplary embodiments:

FIG. 1 shows a diagram of the specific conductivity σ as a function of the temperature T for an undoped $Sr_7Mn_4O_{15}$ ceramic. The suitability for thermistor applications in the high temperature range is documented by the multiple repetition of measurement, and the replicability is documented by measuring a plurality of examples. No drift in the electrical parameters is apparent. The linearity over the temperature range from 600° to 1200° C. can be interpreted as intrinsic conductivity of the compound, while the flatter course in the temperature range from 25° to 600° C. can be ascribed to defects.

Figure 2:
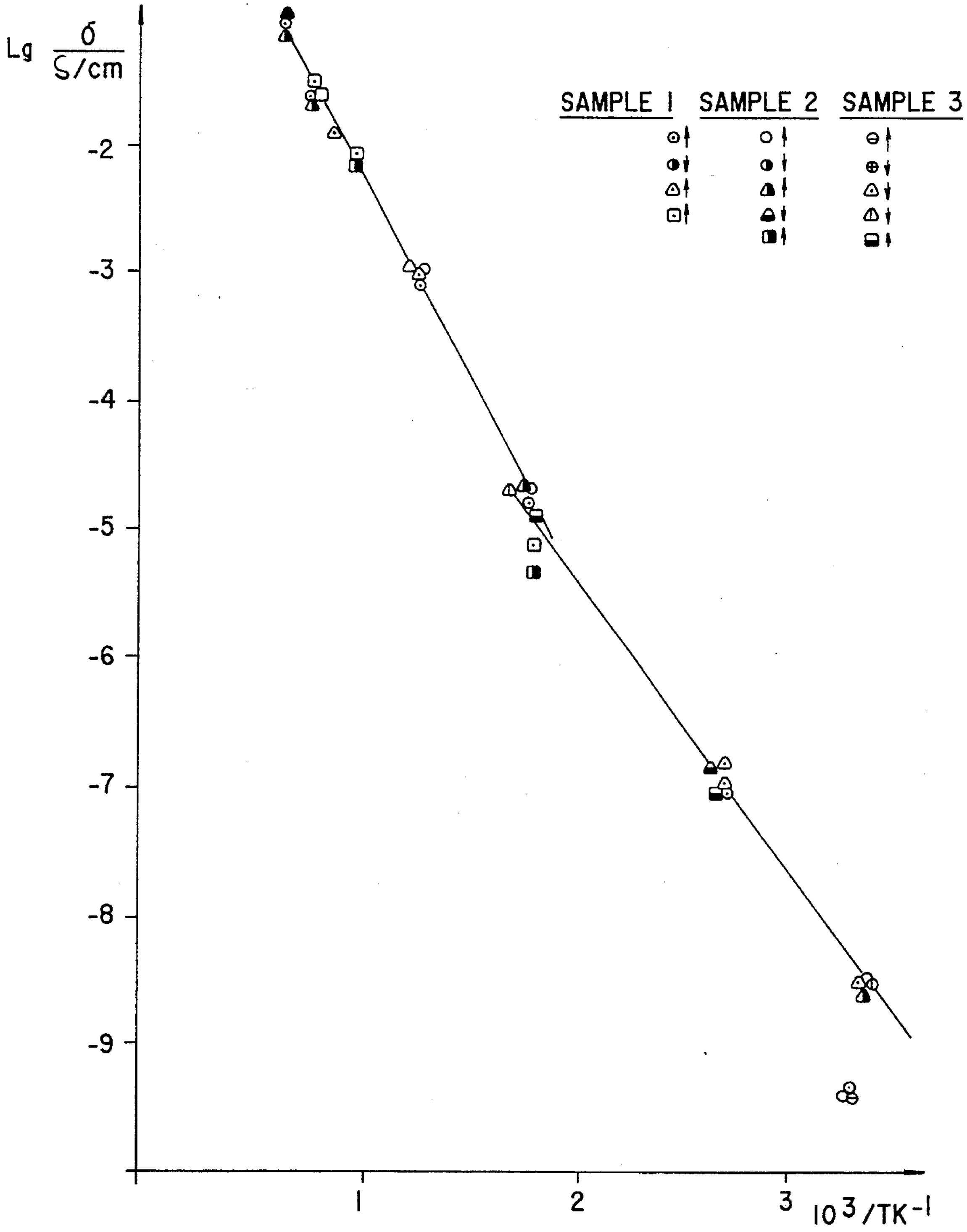
FIG. 2 is a diagram of the specific conductivity as a function of a temperature of a ceramic having the composition $Sr_{6.99}Y_{0.01}Mn_4O_{15}$.

FIG. 2 shows a diagram of the specific conductivity σ as a function of the temperature T for a ceramic, doped with $Y^{III}$ cations, of the composition $Sr_{6.99}Y_{0.01}{}^{III}Mn_{3.99}{}^{III}O_4$.

As expected, a typical slight rise for the doping being performed is ascertained in this case. The somewhat flatter course in the range from 25° C. to 600° C. can be ascribed in this case to defects that result from the production process.

Figure 3:
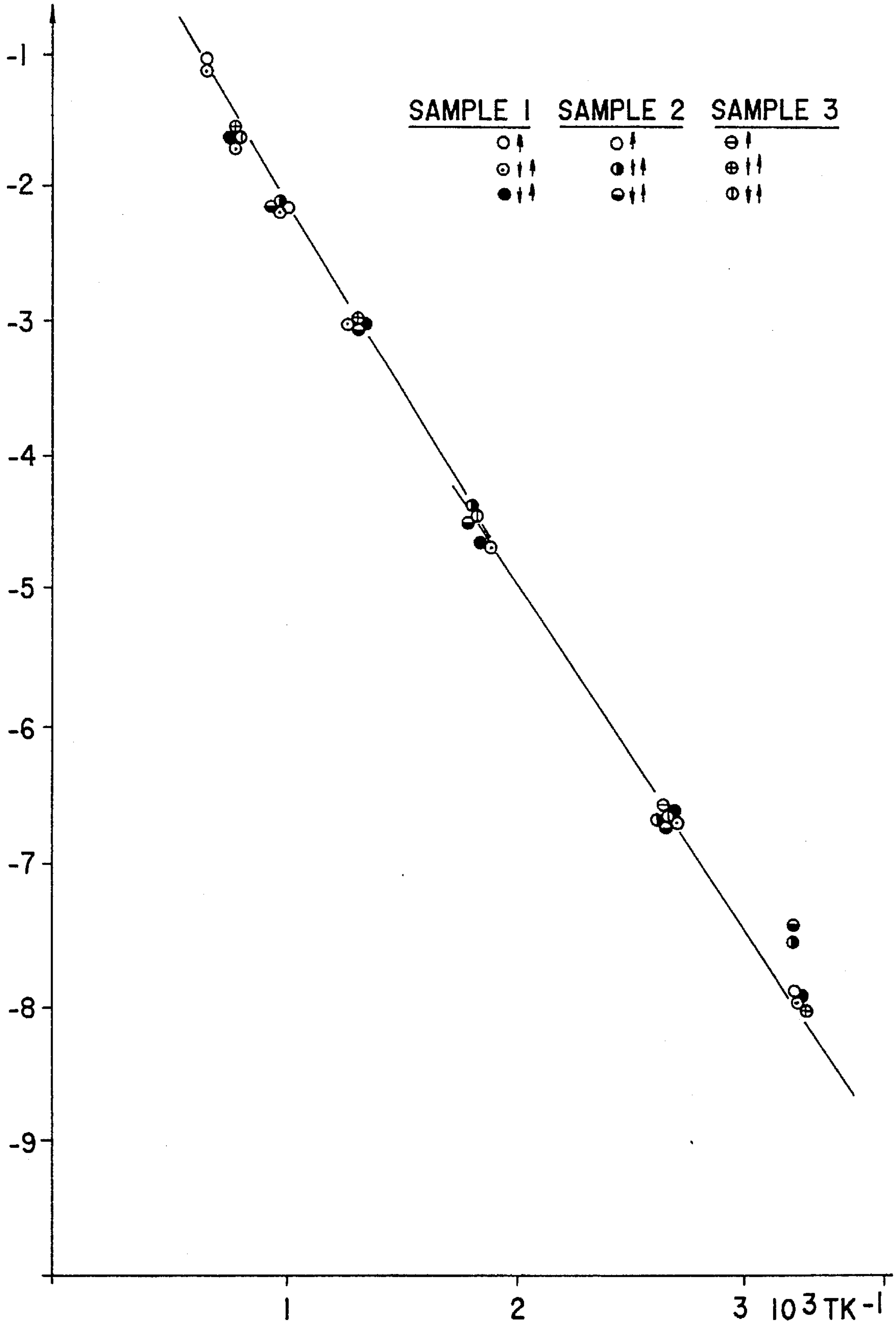
FIG. 3 is a diagram of the specific conductivity as a function of a temperature of a ceramic having the composition $Sr_{6.99}La_{0.01}Mn_4O_{15}$.

FIG. 3 shows a curve course which is analogous to FIG. 2, for a ceramic of the homogeneous composition $Sr_{6.99}La_{0.01}{}^{III}Mn_{0.01}{}^{III}Mn_{3.99}{}^{IV}O_4$.

Figure 4:
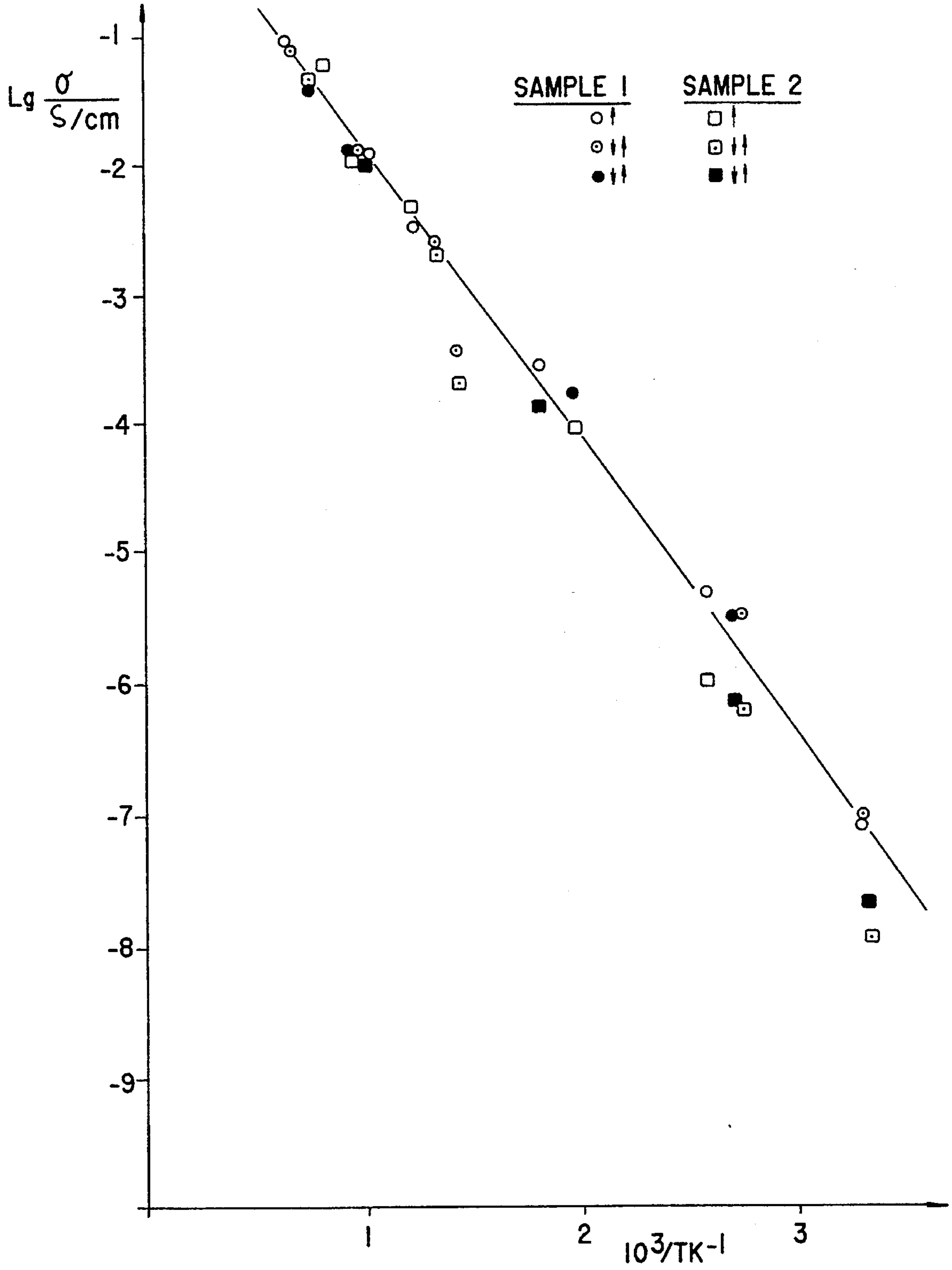
FIG. 4 is a diagram of the specific conductivity as a function of a temperature of a ceramic having the composition $Sr_7Mn_{3.99}Nb_{0.01}O_{15}$.

FIG. 4 shows a diagram of the specific conductivity σ as a function of the temperature T for a niobium-doped ceramic of the composition $Sr_7Mn_{3.98}{}^{IV}Nb_{0.01}{}^{V}Mn_{0.01}{}^{III}O_4$. The electrical conductivity of a thermistor ceramic of this composition is significantly increased in the range of the rated temperature from 25° C. and 100° C., respectively, and the B constant is correspondingly lowered. Its value is adequate for applications in which temperature measurements need to be performed over the entire temperature range from room temperature up to 1200° C.

The properties of thermistor samples based on a pure $Sr_7Mn_4O_{15}$ ceramic and a $Sr_7Mn_4O_{15}$ ceramic modified by the aforementioned dopant components are shown in the following table.

TABLE

Properties of thermistor samples with a diameter d and a height h

| Composition | $\rho_{rel} = \frac{\rho}{\rho_{th}}$ | Dimensions d/mm h/mm | $\sigma_{373\,K}$ s * cm$^{-1}$ | $\sigma_{1,473\,K}$ s * cm$^{-1}$ | $B_{25-600}$/K $B_{600-1,200}$/K |
|---|---|---|---|---|---|
| $Sr_7Mn_4O_{15}$ | 94.3% | 3.22<br>1.50 | 1.1 * 10$^{-7}$ | 0.108 | 12,350<br>4,860 |
| $Sr_{6.99}Y_{0.01}Mn_4O_{15}$ | 91.8% | 3.31<br>1.47 | 1.26 * 10$^{-7}$ | 0.100 | 7,890<br>5,230 |
| $Sr_{6.99}La_{0.01}Mn_4O_{15}$ | 89.2% | 3.34<br>1.47 | 2.15 * 10$^{-7}$ | 0.100 | 6,830<br>5,980 |
| $Sr_7Nb_{0.01}Mn_{3.99}O_{15}$ | 77.4% | 3.25<br>1.48 | 2.15 * 10$^{-6}$ | 0.147 | 5,315<br>(25–1,200) |

We claim:

1. A sintering ceramic for stable high-temperature thermistors, comprising a composition of the formula $Sr_7M_xMn_{4-x}O_{15}$, in which M is a dopant selected from the group consisting of scandium, yttrium, lanthanum, rare earth elements, zirconium, niobium and tantalum, and x is a doping amount greater than zero.

2. The sintering ceramic according to claim 1, wherein said dopant is selected from the group consisting of scandium, zirconium, niobium and tantalum.

3. A method for producing a sintering ceramic for stable high-temperature thermistors, which comprises:

calcining a mixture of $SrCO_3$ and a substance selected from the group consisting of $Mn_2O_3$ and $Mn_3O_4$;

adding an oxide hydroxide of a dopant in a molar quantity x to an aqueous suspension of the calcined oxide mixture to form a composition of the formula $Sr_7M_xMn_{4-x}O_{15}$ in which M is a dopant selected from the group consisting of scandium, yttrium, lanthanum, rare earth elements, zirconium, niobium and tantalum, and x is a doping amount greater than zero; and then carrying out a compacting densification of the composition.

4. The sintering ceramic according to claim 1, wherein said dopant is selected from the group consisting of yttrium and lanthanum.

5. The sintering ceramic according to claim 1, wherein said dopant is an element of the rare earths.

6. The method according to claim 3, which comprises producing thermistor tablets from the composition by compacting shaping, and sintering the tablets at a temperature in the range of 1550° C.

* * * * *

UNITED STATES PATENT AND TRADEMARK OFFICE

CERTIFICATE OF CORRECTION

PATENT NO. : 5,536,449

DATED : July 16, 1996

INVENTOR(S) : Adalbert Feltz, et al

It is certified that error appears in the above-indentified patent and that said Letters Patent is hereby corrected as shown below:

On the title page, item [73] Assignee, should read as follows:

Siemens Matsushita Components GmbH & CO. KG
Munich, Germany

Signed and Sealed this

Thirty-first Day of December, 1996

Attest:

BRUCE LEHMAN

*Attesting Officer* *Commissioner of Patents and Trademarks*